(12) United States Patent
Choi et al.

(10) Patent No.: US 11,614,580 B2
(45) Date of Patent: Mar. 28, 2023

(54) BRAGG GRATING BASED OPTICAL FIBER SENSOR WHICH IS CAPABLE OF MEASURING INFLECTION POINT VECTOR OF CHIRAL MOTION AND MANUFACTURING METHOD THEREOF

(71) Applicant: UIF (University Industry Foundation), Yonsei University, Seoul (KR)

(72) Inventors: Jun Ho Choi, Seoul (KR); Song Bi Lee, Seoul (KR); Song A Choi, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 51 days.

(21) Appl. No.: 17/343,533

(22) Filed: Jun. 9, 2021

(65) Prior Publication Data

US 2021/0389519 A1    Dec. 16, 2021

(30) Foreign Application Priority Data

Jun. 11, 2020  (KR) .................. 10-2020-0071121

(51) Int. Cl.
*G02B 6/02* (2006.01)
*G01D 5/353* (2006.01)
*G01C 19/58* (2006.01)

(52) U.S. Cl.
CPC ........ *G02B 6/02085* (2013.01); *G01C 19/58* (2013.01); *G01D 5/35316* (2013.01); *G02B 6/02147* (2013.01); *G02B 2006/0209* (2013.01)

(58) Field of Classification Search
CPC ............ G02B 6/02085; G02B 6/02147; G02B 2006/0209; G01D 5/35316; G01C 19/58
See application file for complete search history.

(56) References Cited

U.S. PATENT DOCUMENTS

| 7,421,162 | B2 | 9/2008 | McCarthy et al. |
| 10,258,240 | B1 * | 4/2019 | Eberle .................. A61B 5/0084 |
| 2021/0231465 | A1 * | 7/2021 | Froggatt ............ G02B 6/02085 |

FOREIGN PATENT DOCUMENTS

| JP | 2010535113 A | 11/2010 |
| KR | 100774372 B1 | 11/2007 |
| KR | 20080013331 A | 2/2008 |
| KR | 101862131 B1 | 5/2018 |

OTHER PUBLICATIONS

Lee Sang-bae et al., "Fiber optic grating element technology", Optical Science and Technology, Jul. 31, 1998, vol. 2. Issue 2., Optical Society of Korea.

* cited by examiner

*Primary Examiner* — Sung H Pak

(57) ABSTRACT

The exemplary embodiments provide an optical fiber sensor and a vector measuring device which measure a motion of a subject using a double Bragg grating formed in a core with a helical structure and measure a chiral motion inflection point vector.

16 Claims, 18 Drawing Sheets

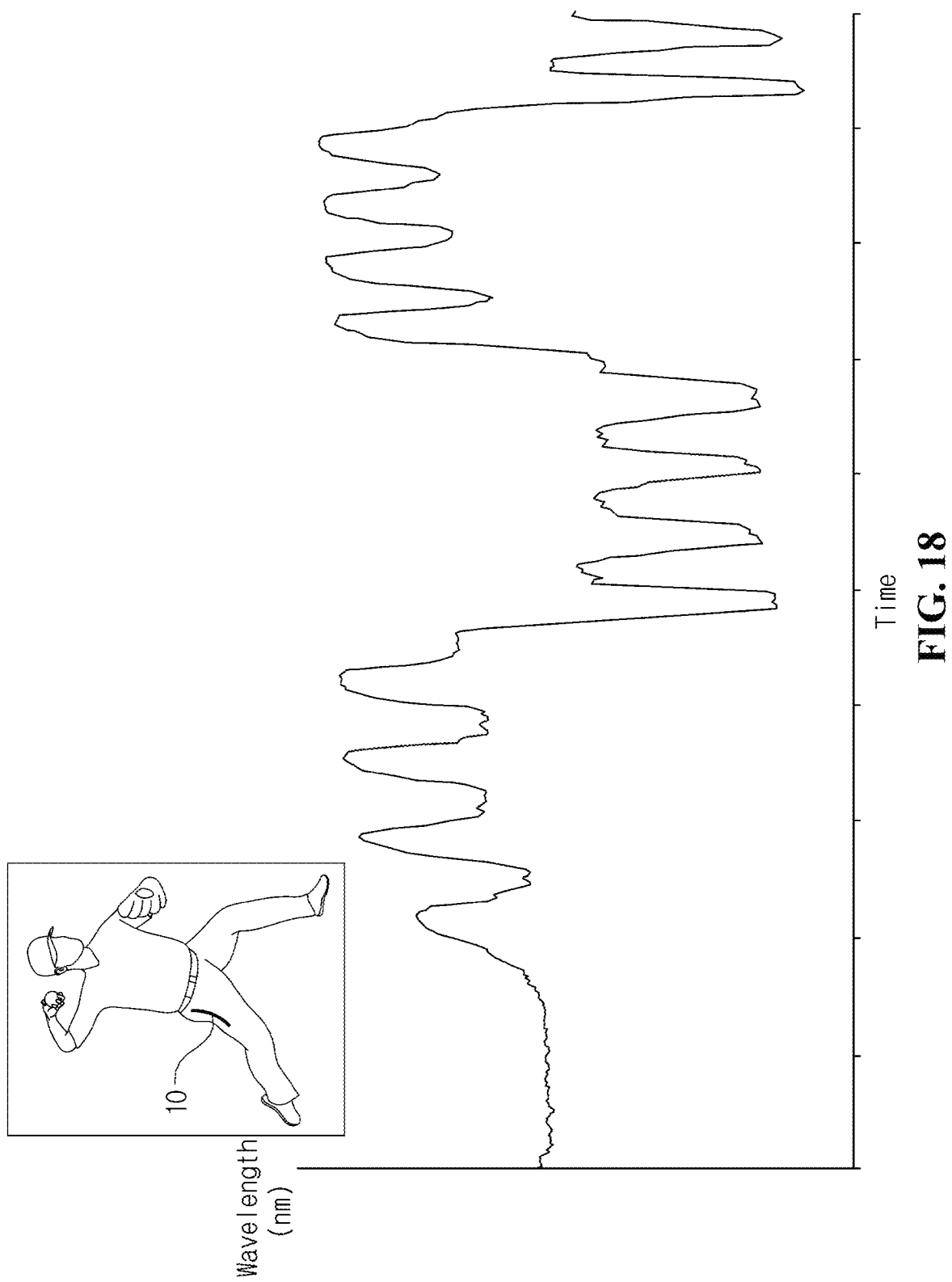

BRAGG GRATING BASED OPTICAL FIBER SENSOR WHICH IS CAPABLE OF MEASURING INFLECTION POINT VECTOR OF CHIRAL MOTION AND MANUFACTURING METHOD THEREOF

CROSS-REFERENCE TO RELATED APPLICATIONS

This application claims priority to and the benefit of Korean Patent Application No. 10-2020-0071121 filed in the Korean Intellectual Property Office on Jun. 11, 2020, the entire contents of which are incorporated herein by reference.

TECHNICAL FIELD

The technical field of the present disclosure relates to a Bragg grating based optical fiber sensor and a vector measuring device.

BACKGROUND ART

The contents described in this section merely provide background information on the present exemplary embodiment but do not constitute the related art.

The optical fiber sensor is a sensor which measures external physical quantities by detecting changes in characteristics of light in an optical fiber. Characteristics of light such as an intensity, a frequency, a phase, or polarization of light traveling in the optical fiber are modified by the external physical quantities and the characteristics of light are sensed by an optical detector to measure the external physical quantities.

An optical fiber Bragg grating sensor is a sensor using a characteristic in that a wavelength of light reflected from each grating varies in accordance with an ambient temperature or a tensile strength, after inscribing optical fiber Bragg gratings in the optical fiber. In order to increase a refractive index of a core of the optical fiber to be higher than that of a cladding, when a specific material is added into the core and the specific material is satisfactorily positioned in silica glass, a structural defect may be caused. When a strong ultraviolet ray is irradiated onto the optical fiber core, a bonding structure of the material is modified to change the refractive index of the optical fiber.

The optical fiber Bragg grating periodically changes the refractive index of the optical fiber core using this phenomenon. The Bragg grating has a characteristic in that only a wavelength which satisfies the Bragg condition is reflected, but other wavelength is transmitted as it is. When the ambient temperature of the grating is changed or a stress is applied to the grating, the refractive index or a length of the optical fiber is changed so that a wavelength of reflected light is modulated. Therefore, a temperature, a tension, or a pressure, a curvature may be sensed by measuring a wavelength of light reflected from the optical fiber Bragg grating.

RELATED ART DOCUMENT

Patent Document (Patent Document 1) KR. 10-0774372 (Nov. 1, 2007)
(Patent Document 2) KR 10-1862131 (May 23, 2018)
(Patent Document 3) U.S. Pat. No. 7,421,162 (Sep. 2, 2008)

SUMMARY OF THE INVENTION

A major object of exemplary embodiments of the present disclosure is to output a motion of a subject as a vector by forming a double Bragg grating in a core with a helical structure.

Other and further objects of the present invention which are not specifically described can be further considered within the scope easily deduced from the following detailed description and the effect.

According to an aspect of the present embodiment, a manufacturing method of an optical fiber sensor includes: forming three or more basic Bragg gratings in a core; and forming a sub Bragg grating between two continuous basic Bragg gratings in the core.

The manufacturing method of an optical fiber sensor may further include, a step of forming a core having a helical structure by rotating and injecting the core, before the step S101 of forming basic Bragg gratings.

In the forming of a basic Bragg grating, the basic Bragg grating is formed by irradiating ultraviolet onto the core.

In the forming of a sub Bragg grating, the sub Bragg grating is formed by irradiating pulse laser onto the core.

In the forming of a basic Bragg grating, the basic Bragg grating is formed in the core with a long period in which a length of a section varies.

In the forming of a sub Bragg grating, the sub Bragg grating is formed in the core with a short period with a uniform length.

According to another aspect of the present embodiment, an optical fiber sensor includes: a core in which a Bragg grating is formed; and a cladding which surrounds the core, and the Bragg grating includes (i) three or more basic Bragg gratings and (ii) a sub Bragg grating located between continuous two basic Bragg gratings.

The optical fiber sensor may further include: a protective layer which surrounds the cladding.

The core may be formed to have a helical structure.

The protective layer may be implemented by a woven material.

A helical angle of the helical structure and a braiding angle of the woven material are set to satisfy a predetermined condition range.

The core with the helical structure moves a wavelength of the Bragg grating using an elastic wave in accordance with the helical structure and accelerates a direction changing speed of the optical fiber sensor.

The core formed with a helical structure may change a critical angle of light by modifying an incident angle of light in accordance with the helical structure.

The basic Bragg grating may be formed with a long period in which a length of the section is changed.

The basic Bragg grating does not affect the movement of the wavelength of the Bragg grating and forms a periodic pattern of a magnitude of a wavelength of the Bragg grating to provide a relative reference for space measurement.

The basic Bragg grating operates as a filter which passes regions other than a peak of a spectrum by a coupling phenomenon by interaction of a core mode and a cladding mode.

The long period includes a chirp section having a non-uniform length which linearly or non-linearly changes in a light traveling direction.

The sub Bragg grating is formed with a short period having a uniform length.

A resonance of an optical signal is formed by a wavelength shift of the basic Bragg grating and a wavelength shift of the sub Bragg grating.

The optical fiber sensor may further include: a plurality of elastic strings which surrounds the cladding.

The core and the cladding may be formed in the elastic body.

The elastic body includes the curve section and the straight section and the sub Bragg grating is located on the straight section.

According to another aspect of the present embodiment, a vector measuring device includes: an optical fiber sensor; a wavelength measuring unit which transmits an optical signal to the optical fiber sensor and receives an optical signal with a changed wavelength; and a vector processor which analyzes the optical signal with a changed wavelength to output a vector for a motion of a subject, the optical fiber sensor may further include: a core in which a Bragg grating is formed; and a cladding which surrounds the core, the Bragg grating includes (i) three or more basic Bragg gratings and (ii) a sub Bragg grating located between continuous two basic Bragg gratings.

As described above, according to the exemplary embodiments of the present disclosure, a motion of the subject may be measured using a double Bragg grating formed in a core with a helical structure and an inflection point vector of a chiral motion may be measured.

Even if the effects are not explicitly mentioned here, the effects described in the following specification which are expected by the technical features of the present disclosure and their potential effects are handled as described in the specification of the present disclosure.

BRIEF DESCRIPTION OF THE DRAWINGS

FIGS. 17 and 18 are views illustrating a change in a wavelength of an optical signal output from an optical fiber sensor according to another exemplary embodiment of the present disclosure which is attached to a pelvis.

DETAILED DESCRIPTION OF THE EMBODIMENT

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

An optical fiber sensor according to the present exemplary embodiment is capable of monitoring a continuous motion of a body movement using a double Bragg grating formed in a core with a helical structure. The optical fiber sensor according to the present exemplary embodiment may measure a continuous flow of a static motion and a continuous flow of a dynamic motion, and an inflection point in accordance with an instantaneous wavelength shift.

Figure 1:
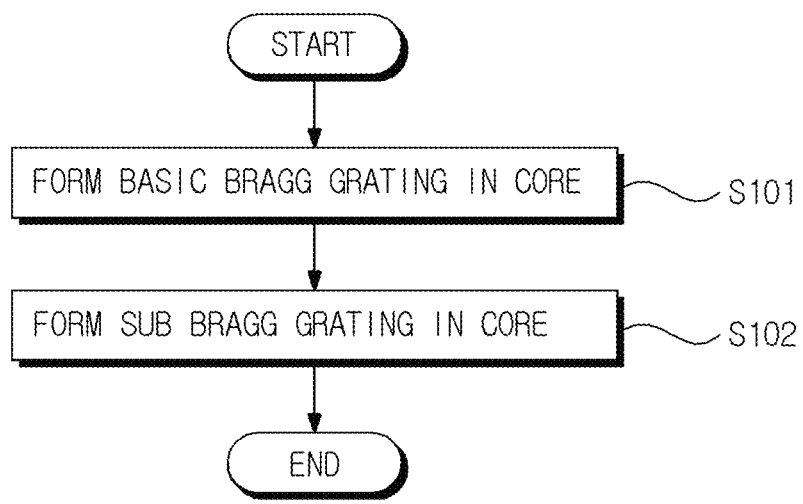
FIG. 1 is a flowchart illustrating a manufacturing method of an optical fiber sensor according to an exemplary embodiment of the present disclosure.

FIG. 1 is a flowchart illustrating a manufacturing method of an optical fiber sensor according to an exemplary embodiment of the present disclosure.

A manufacturing method of an optical fiber sensor includes a step S101 of forming three or more basic Bragg gratings in a core and a step S102 of forming sub Bragg gratings between two continuous basic Bragg gratings in the core.

The manufacturing method of an optical fiber sensor further includes a step of forming a core having a helical structure by rotating and injecting the core, before the step S101 of forming basic Bragg gratings. The helical structure is different from a simple twist structure.

In the step S101 of forming basic Bragg gratings, the basic Bragg gratings may be formed by irradiating the ultraviolet ray onto the core. In the step S101 of forming basic Bragg gratings, a basic Bragg grating may be formed in the core with a long period in which lengths of the sections are changed.

In the step S102 of forming sub Bragg gratings, a sub Bragg grating may be formed by irradiating pulse laser onto the core. For example, a femtosecond laser may be used. In the step S102 of forming sub Bragg gratings, the sub Bragg grating may be formed in the core with a short period with a uniform length.

Figure 2:
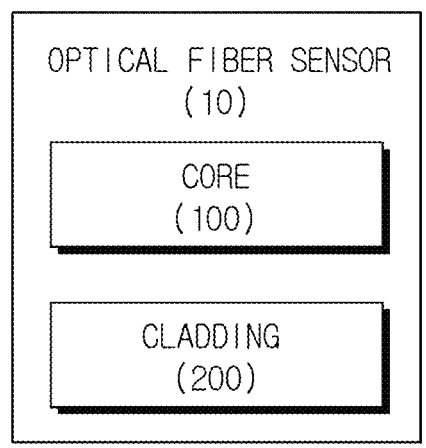
FIG. 2 is a block diagram illustrating an optical fiber sensor according to another exemplary embodiment of the present disclosure.
Figure 3:
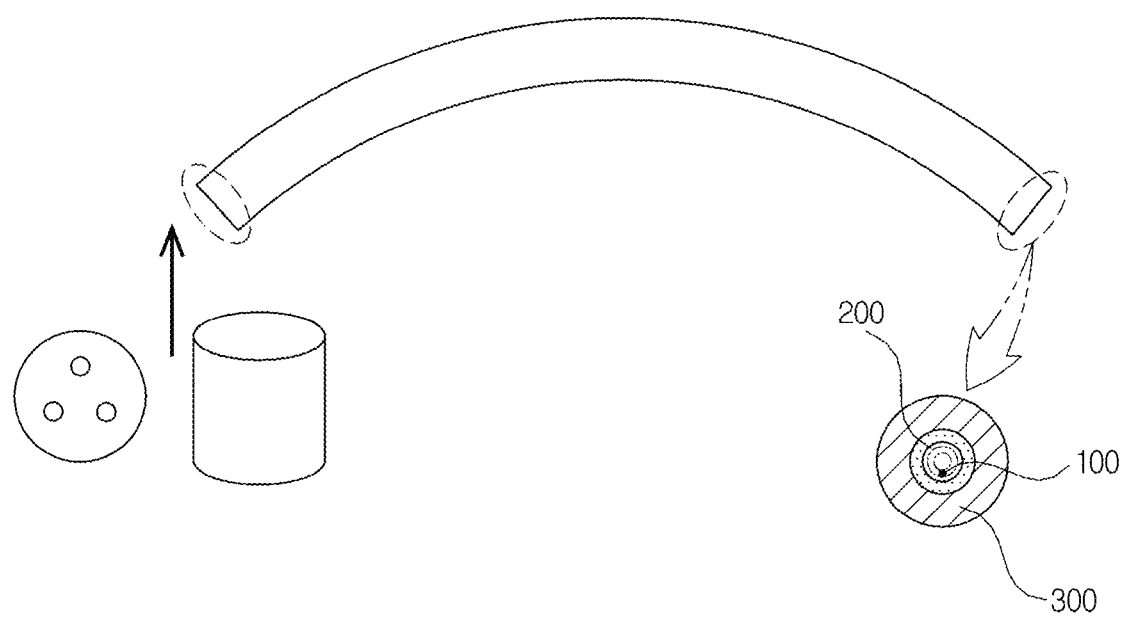
FIG. 3 is a view illustrating an outer appearance of an optical fiber sensor according to another exemplary embodiment of the present disclosure.
Figure 4:
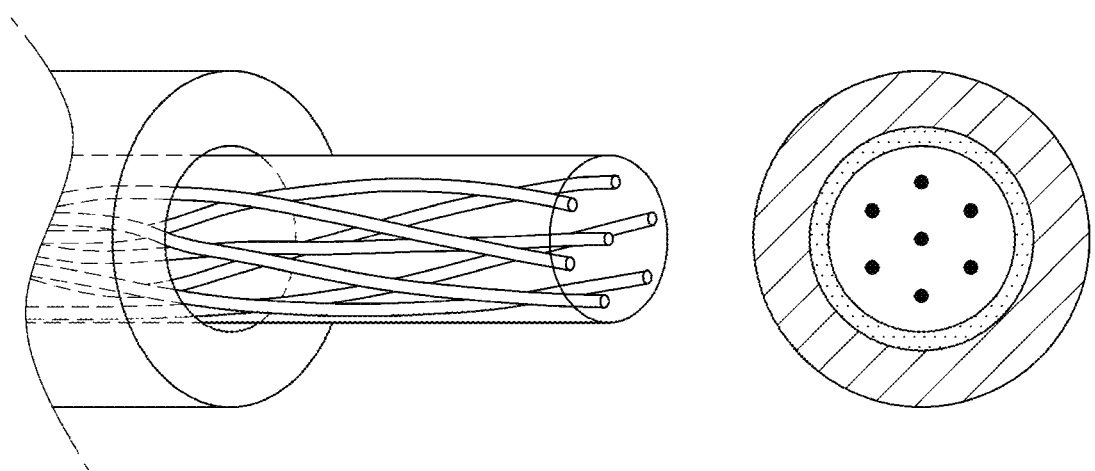
FIG. 4 is a view illustrating a cross-section of an optical fiber sensor according to another exemplary embodiment of the present disclosure.

FIG. 2 is a block diagram illustrating an optical fiber sensor according to another exemplary embodiment of the present disclosure. FIG. 3 is a view illustrating an outer appearance of an optical fiber sensor according to another exemplary embodiment of the present disclosure. FIG. 4 is a view illustrating a cross-section of an optical fiber sensor according to another exemplary embodiment of the present disclosure.

The optical fiber sensor 10 includes a core 100 in which the Bragg grating is formed and a cladding 200 which surrounds the core 100. The optical fiber sensor 10 may further include a protective layer 300 which surrounds the cladding 200. The protective layer 300 may include a coating layer and a jacket layer for shielding and protecting the cladding from the outside. A shaft fixing holder may be provided at an end of the optical fiber sensor 10.

The optical fiber sensor 10 may be located on both ends or one side of a portion to be measured by the sensor. The optical fiber sensor may be located at a center of the motion or an end of the motion.

The optical fiber sensor 10 may be formed by a single core or a plurality of cores depending on the number of cores in the cladding.

The optical fiber sensor 10 may be formed by a one-point type, a multiple type, or a distributed type, depending on the position of the Bragg grating in the core. One point type is a simple structure in which one or more Bragg gratings are inscribed in a narrow section of one core. The multiple type is a structure in which the Bragg gratings are inscribed as a one-point type in each of various sections of one core. For example, according to the double type, two groups of one-point types may be located at both ends of the core. The distributed type is a structure in which the Bragg gratings are continuously inscribed over a broad section of one core.

The optical fiber Bragg grating is formed with a short length having many patterned reflection points which reflect a specific wavelength of incident light. Not all the wavelengths of the optical signal are reflected or attenuated, but only some wavelengths are transmitted through the gratings. The optical signal reflected from each grating has a narrow spectrum. When a wavelength of a reflection peak is analyzed, a transition factor may be found out.

An optical fiber Bragg wavelength satisfies a Bragg condition of $\lambda_B = 2 n_e A$. Here, $n_e$ is an effective refractive index of the optical fiber grating and refers to an average refractive index when light travels one cycle of the Bragg grating. A refers to a Bragg grating period inscribed in the optical fiber. When the change in the Bragg wavelength is measured, a physical quantity applied to the optical fiber grating may be calculated.

Even though a plurality of gratings is used for one optical fiber, when reflective wavelengths of the gratings are set to be different from each other, a physical quantity corresponding to each grating may be distinguished from a spectrum of the reflected optical signal. It is referred to as a wavelength division type.

The optical fiber sensor according to the present exemplary embodiment may continuously and precisely measure a correlation flow of the identical wavelength with a proximity wavelength and a division shift flow of Bragg wavelengths of the identical wavelength located in different positions.

In the optical fiber sensor according to the present exemplary embodiment, a wavelength reflected from the grating is expressed by a function of an effective refractive index and a grating period of the identical Bragg wavelength in different positions. The optical fiber sensor according to the present exemplary embodiment may measure precise Young's modulus point pattern in a left-right balanced flow. The precise flow pattern generates a periodic Young's modulus point signal which is left-right balanced.

The sensor may identify a chiral body motion by a signal acquired from the repeated pattern of the Young's modulus. The chiral body motion is classified into a static equilibrium state and a dynamic equilibrium state. The static balance state is measured by measuring a posture stability and equilibrium by adjusting the posture and the dynamic balance state is measured by measuring instantaneous inflection speed and acceleration of the body motion.

Unlike measurement of a physical quantity of a general object as an absolute value, it is desirable to analyze the motion of the dynamic structure by a relative value. Specifically, the relative numerical analysis is appropriate to measure a Young's modulus of the chiral structure. The motion of the chiral structure has a property following a gentle three-dimensional inclination in which vertical and horizontal excursions are mixed.

A body structure of an animal is formed by a chiral structure and muscles and bones are organically connected. The sensor provides static and dynamic measurement ranges and accuracies of the skeletal system. This sensor induces the Bragg wavelength shift by the change in a critical angle of light by diagonal deformation of an incident angle of light and the change in the refractive index deformed by external strain. The change in the critical angle and the change in the refractive index enable the measurement of the direction. The degree of wavelength shift is measured to measure a scalar quantity and the wavelength shift has a positive sign or a negative sign depending on a strain stress direction so that the direction may be measured.

The shift of the strain shows a negative or positive uniaxial crystal property under a compression or tension by photoelasticity of the optical fiber. The actual stress acts on the optical axis. A quantitative value of the stress which acts on the optical axis is calculated by the shift of the wavelength. The photoelasticity of the optical fiber means that a mechanical stress is applied to a optically isotropic material to make the material anisotropic.

Figure 5:
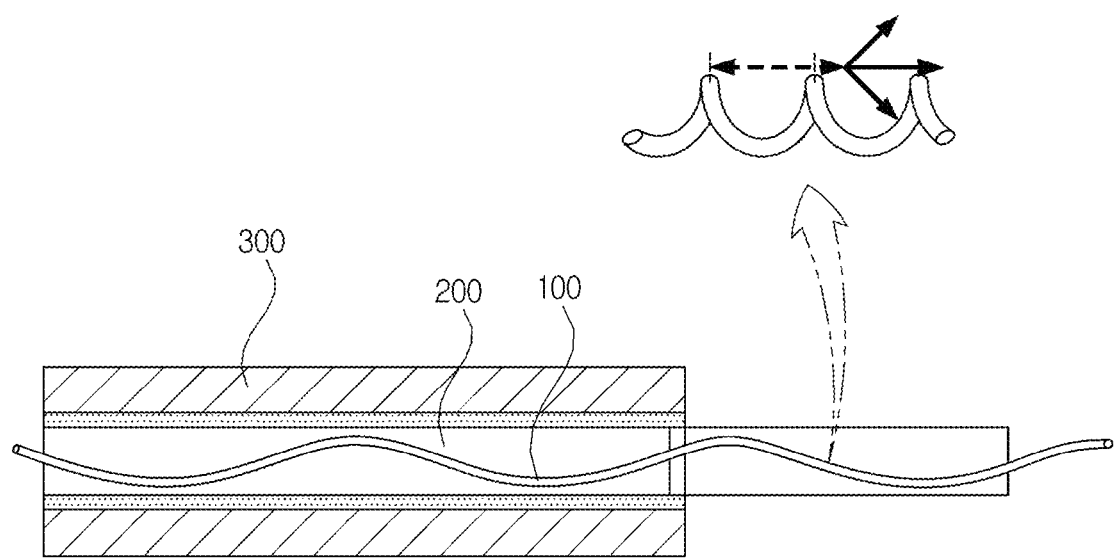
FIG. 5 is a view illustrating a core which is formed with a helical structure in an optical fiber sensor according to another exemplary embodiment of the present disclosure.

FIG. 5 is a view illustrating a core which is formed with a helical structure in an optical fiber sensor according to another exemplary embodiment of the present disclosure.

The core 100 is formed to have a helical structure.

The helical core structure is a basic structure to enable continuous Young's modulus measurement of the chiral motion inflection measurement. The helical core structure enables the wavelength shift of the Bragg grating only by changing the Young's modulus of the optical fiber alone.

The shift of the Bragg wavelength induces a specific Bragg wavelength in accordance with the change of the refractive index by a strain applied to an axis of a light wave from the outside. The basic optical fiber sensor is adjusted by applying a longitudinal strain which is a strain of the axis of the light wave. The basic optical fiber sensor uses the deformation of a mechanic physical property which causes a deformation of the refractive index by inducing a tension of the optical fiber so that the adhesive degree with the subject significantly affects the measurement accuracy.

According to a method of the related art, a curvature of a complex body surface is pressed to be stretched so that it is difficult to measure a natural continuous flow of the body. According to the method of the related art, it is difficult to measure a spatial body motion.

Unlike the method of the related art, it is possible to reflect a spatial motion property to measure a body surface by applying a helical core structure. The helical core structure provides a sensitivity which makes it possible to measure a complex shape of the body surface. The helical core structure is free from a strain of an external structure and makes it possible to measure a direction only by controlling a direction of an optical core.

The helical core structure is a mechanical structure which helps to precisely measure a direction changing speed when the vector direction is changed. The core formed with a helical structure moves a wavelength of the Bragg grating using an elastic wave in accordance with the helical structure and accelerates a direction changing speed of the optical fiber sensor.

The wavelength shift of the Bragg grating by applying an asymmetrical shear force strain of the helical structure enhances an accuracy to measure a continuous wavelength shift of the body motion.

The core formed with a helical structure may change a critical angle of light by modifying an incident angle of light in accordance with the helical structure. The change in waveform may be induced by changing a wave front and polarization.

Figure 6:
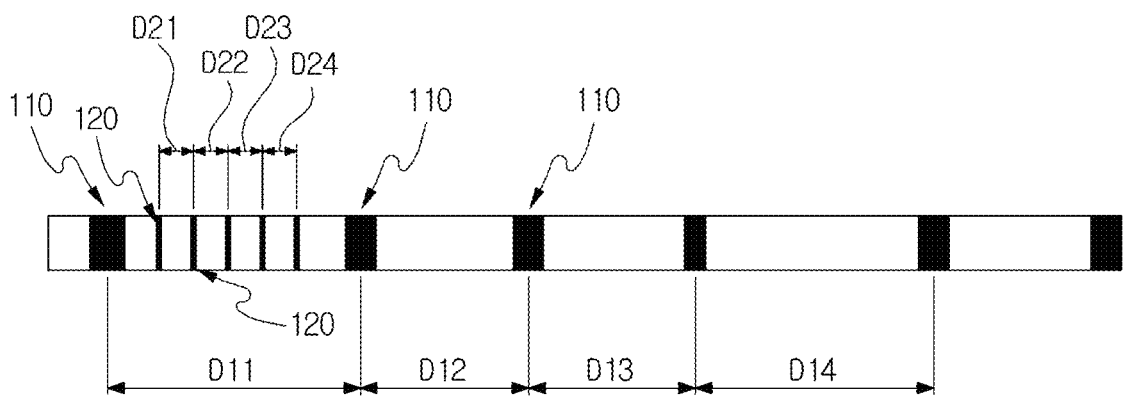
FIG. 6 is a view illustrating a double Bragg grating of an optical fiber sensor according to another exemplary embodiment of the present disclosure.

FIG. 6 is a view illustrating a double Bragg grating of an optical fiber sensor according to another exemplary embodiment of the present disclosure.

The Bragg grating includes (i) three or more basic Bragg gratings 110 and (ii) a sub Bragg grating 120 located between two continuous basic Bragg gratings.

The basic Bragg grating 110 may be formed with a long period in which lengths of the sections are changed. The basic Bragg grating 110 forms a periodic pattern in a magnitude of a wavelength of the Bragg grating to provide a relative reference for space measurement without affecting the movement of the wavelength of the Bragg grating. The basic Bragg grating 110 may operate as a filter which passes regions other than a peak of a spectrum by a coupling phenomenon by interaction of a core mode and a cladding mode.

The long period may include chirp sections D11, D12, D13, and D14 having non-uniform lengths which linearly or non-linearly change in a light traveling direction.

The sub Bragg grating 120 may be formed with short periods D21, D22, D23, D24 with a uniform length.

The optical sensor 10 forms a resonance of an optical signal by a wavelength shift of the basic Bragg grating 110 and a wavelength shift of the sub Bragg grating 120.

The wavelength reflected from the grating of the sensor is a function of an effective refractive index and a grating spacing of the identical Bragg wavelength located in different positions. A precise torsion point pattern is measured in the horizontal balanced flowchart. The pattern of the precise flowchart may generate a periodical torsion point signal of the horizontal balance.

The double structure of a long period grating and a short period grating formed in the sensor may be formed by a primary long period UV irradiating process and a secondary short period femtosecond laser irradiating process. The double Bragg grating may include chirp type continuous long period gratings and uniform short period gratings.

A Bragg grating design between short period gratings connected by a long period bridge allows setting of a coordinate appropriate to spatially measure Young's modulus. The long period grating does not affect the movement of the Bragg and generates a periodic pattern with a predetermined magnitude to allow a magnitude of each Bragg wavelength to have a periodic property.

The long period grating is phase-shifted with respect to light which moves through both paths of a core mode and a cladding mode by scattering and interference of the light by means of an effective refractive index of the core and cladding and change of the effective refractive index of the core and is coupled by the core and the cladding to propagate to the core to generate an interference pattern. However, the long period grating does not affect the measurement of the Bragg wavelength and sets a coordinate axis for measurement a spatial shape.

The light has a relationship by a phase change measuring method by Fresnel reflection and transmission. The phase refers to a comparison angle with respect to the reference and the angle is written by degree or radian. The change of the wavelength may be known using an absolute phase and a relative phase.

The long period grating passes the remaining part except for a peak of the spectrum by a coupling phenomenon by interaction of the core mode and the cladding mode in the optical fiber. A signal of a wavelength shift may be easily measured by the filter. A pattern signal of the wavelength shift related to the body motion may be derived using a complex Bragg grating of a long period grating and a short period grating.

The femtosecond laser grating points may be located on both ends of the measurement position and induces a Bragg wavelength of the identical wavelength.

A distributed sensor of proximity spectrum using a tension strain may measure the monitoring by a central wavelength shift of the normal Bragg wavelength of the absolute measurement with delicate measurement resolution.

Central wavelengths of the identical proximity wavelengths are gathered at a peak of the same phase. A Bragg central wavelength induced by short period gratings at both ends is divided into two parts by the modification of an external strain or reacts to the change by a relative strain of the short period gratings at both ends by various curvature wavelength separation changes. The Young's modulus monitoring may be measured by the change of the waveform to measure a relative magnitude of the reflection.

A signal fitted to four dynamic patterns of the Young's modulus may be acquired using a double grating design. Stepwise vertical rising/falling and diagonal rising/falling signals may be measured. A wavelength shift differential coefficient according to a static motion and a dynamic motion of the time may be measured.

Figure 7:
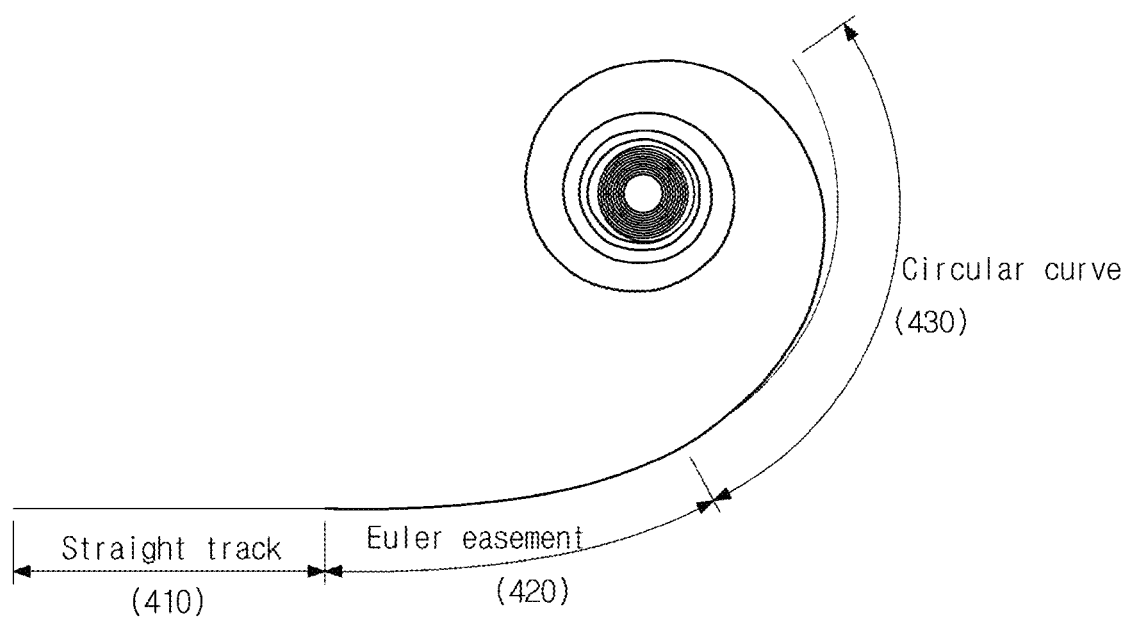
FIG. 7 is a view illustrating an outer appearance of an elastic body of an optical fiber sensor according to another exemplary embodiment of the present disclosure.

FIG. 7 is a view illustrating an outer appearance of an elastic body of an optical fiber sensor according to another exemplary embodiment of the present disclosure.

The optical fiber sensor 10 may include a secondary structure of a loading frame having a rigidity and an elasticity which may coexist with a physical property of the optical fiber. The structure is a loading frame of measuring a Young's modulus suitable for movement of a spatial force. The structure is suitable for a spatial curvature flow of the body surface and extends a range affected by the sensor to be operated as a wearable sensor.

The optical fiber sensor 10 includes an elastic body having a curve section and a core and a cladding may be formed on the elastic body. For example, the core and the cladding may be attached onto an outside of the elastic body or buried in the elastic body. The optical fiber sensor 10 may further include a fastener for attaching the elastic body to the subject.

It is desirable to dispose the sub Bragg grating to be close to an end direction of the motion of the subject. For example, when an arm motion is measured, the sub Bragg grating may be disposed on the forearm between a shoulder (a center of the motion) and a forearm (an end of the motion).

The elastic body includes curve sections 420 and 430 and a straight section 410 so that the sub Bragg grating is located in the straight section 410. The sub Bragg grating may also be located in the curve sections 420 and 430, but it is desirable to attach the curve section to be close to a motion center of the subject. Alternatively, the straight section is located on the forearm and the curve section is located on the shoulder.

The optical fiber sensor 10 includes a loading rod structure using correlation of a chiral structure and Young's modulus. An elastic load cell design cooperates with a photoelastic response speed to provide expansion and efficiency of transmission operation of a chiral force of a body structure. The structure enables the sensor to precisely measure a mechanical transformation distribution.

A Euler spiral curve which is a loading elastic body which connects the operation of spatial external force and the sensor may be used. The flows of the Bragg grating which is located in a different position from a range in which the Bragg grating is inscribed may be connected using the elastic rod. It is possible to smoothly transmit the conversion of the operation of the force in consideration of the dynamic motion of the body. A physical property of the secondary structure of the loading frame may set the rigidity and the elasticity in consideration of the correlation with the photoelasticity.

The wavelength shift of the sensor associates the Bragg wavelength shift in the sensor range by the chiral motion with the elastic wave flowchart of the elastic body to expand the sensor measurable range. The bridge with a connected structure is continuously on the wavelength shift flow.

The Euler curve has three Young' modulus transmitting steps. There are a circular curve section for transmitting a motion of the body to the sensor, an Euler easement section having a changing point of the Young's modulus, and a straight track section in which the effectiveness of the elastic wave is lost or maintained. The sensor may be located on the circular curve. The changing point of the Young's modulus is located on the Euler easement. The other pair of sensors may be connected in the straight track.

Figure 8:
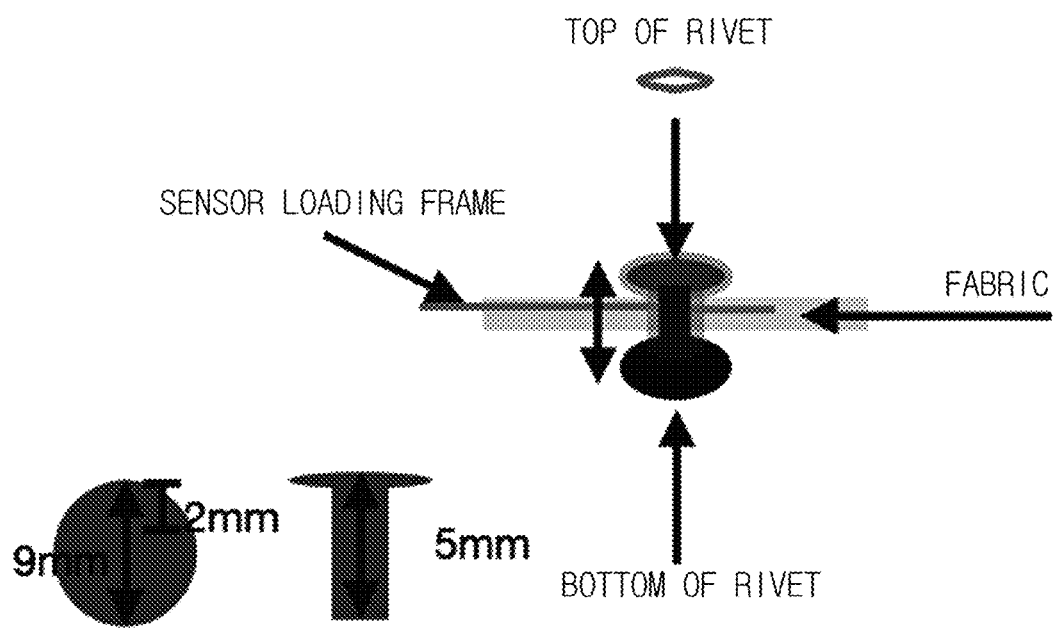
FIG. 8 is a view illustrating the weaving of an optical fiber sensor according to another exemplary embodiment of the present disclosure.
Figure 9:
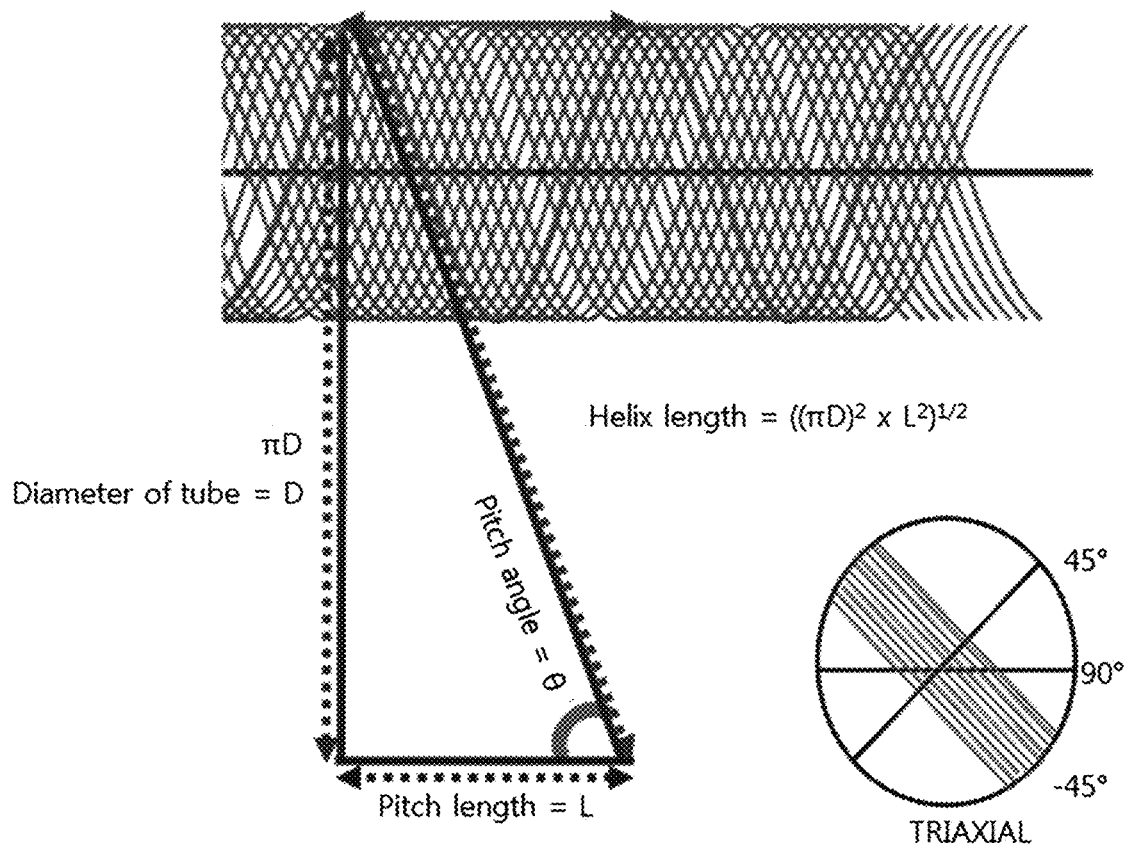
FIGS. 9 and 10 are views illustrating a braiding angle of a woven material applied to an optical fiber sensor according to another exemplary embodiment of the present disclosure.
Figure 10:
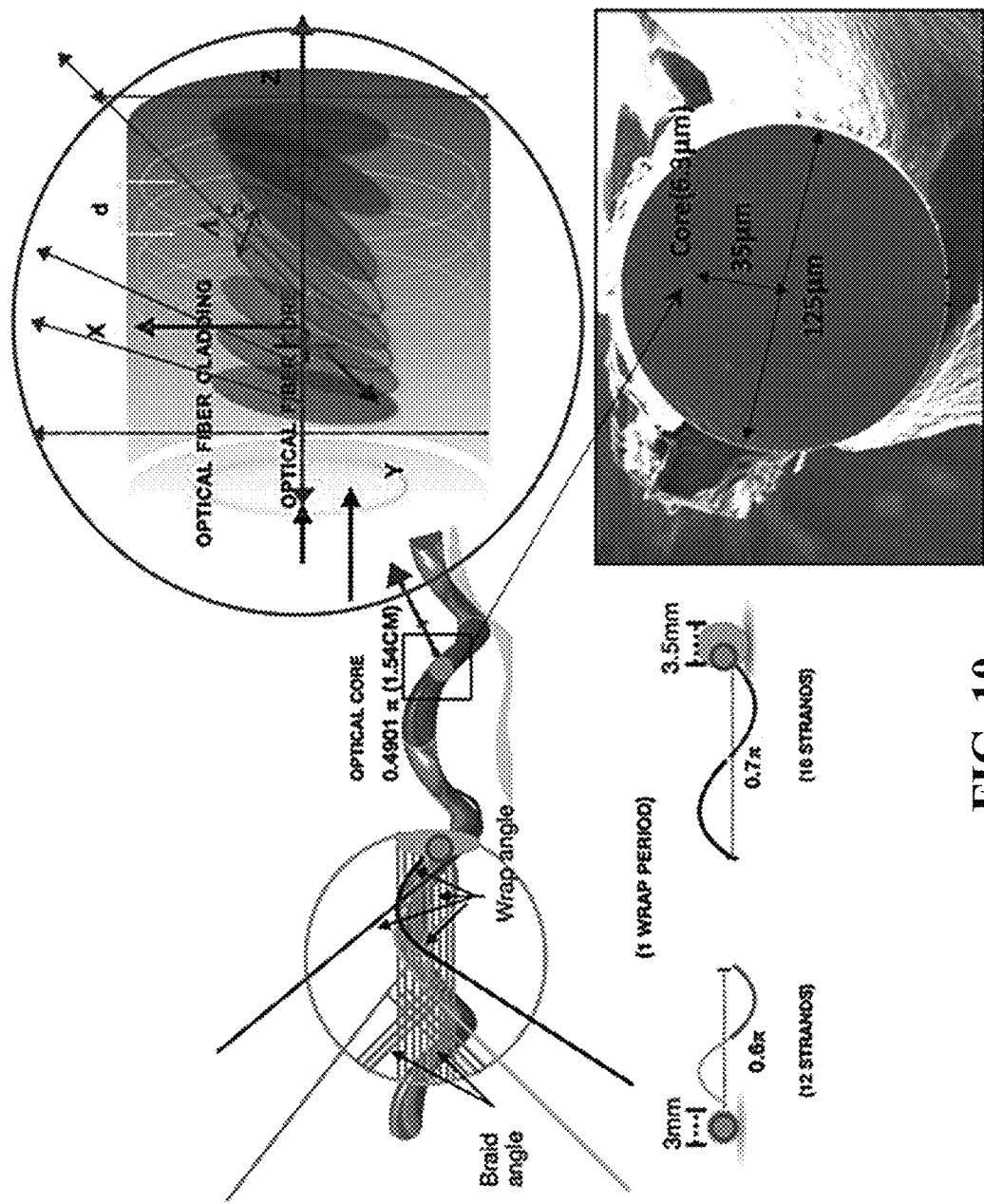
Figure 11:
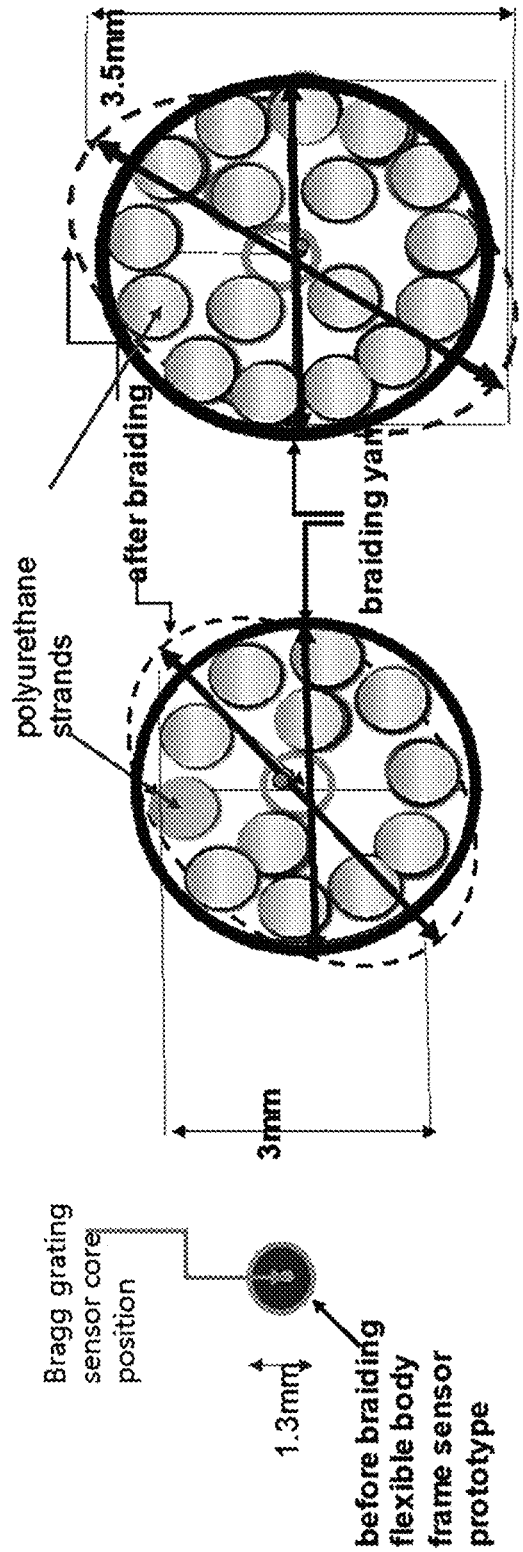
FIG. 11 is a view illustrating an elastic string and a woven material applied to an optical fiber sensor according to another exemplary embodiment of the present disclosure.

FIG. 8 is a view illustrating the weaving of an optical fiber sensor according to another exemplary embodiment of the present disclosure, FIGS. 9 and 10 are views illustrating a braiding angle of a woven material applied to an optical fiber sensor according to another exemplary embodiment of the present disclosure, and FIG. 11 is a view illustrating an elastic string and a woven material applied to an optical fiber sensor according to another exemplary embodiment of the present disclosure.

The optical fiber sensor is applicable as a wearable sensor in a predetermined tension range between a primary body loading frame of a fiber core and a braiding woven cord. A fastening unit may be included to fix a frame of the wearable sensor. For example, a rivet may be used. In order to constantly maintain an internal tension, an elastic string may be applied. For example, as the elastic string, a polyurethane string may be applied. The elastic string may be woven in the braiding. As a yarn used for the braiding, a general poly based synthetic fiber may be applied and other woven materials are also applicable.

The optical fiber sensor according to the exemplary embodiment is woven to be used as a wearable sensor by an internal tension of the braiding. The packaging method of the braiding brings a stability to an elastic index of the helical core sensor. A helical angle of the helical core and a braiding angle condition of the woven material match to satisfy a wearable sensor condition. A wrap angle may be further considered in addition to the braiding angle.

As illustrated in FIGS. 9 and 10, an appropriate internal tension range of the braiding angle corresponding to a pitch angle may be calculated.

The helical angle refers to a gradient of the core wound in a rotation direction and may be considered as a pitch angle. The braiding angle refers to a gradient of yarn wound during the braiding process and may be considered as a pitch angle. For example, when the helical angle is assumed as 45 degrees, the braiding angle may be set to satisfy a range of 40 degrees to 50 degrees.

A sensing rate of a sensor structured by a stress parallel to an axis of a light wave in the braiding condition in accordance with the helical angle and the braiding angle is improved by two times or more. It shows that a designed sensor is more sensitive to stress parallel. The sensor may operate sensitively only to a vibration parallel to a Z axis.

Figure 12:
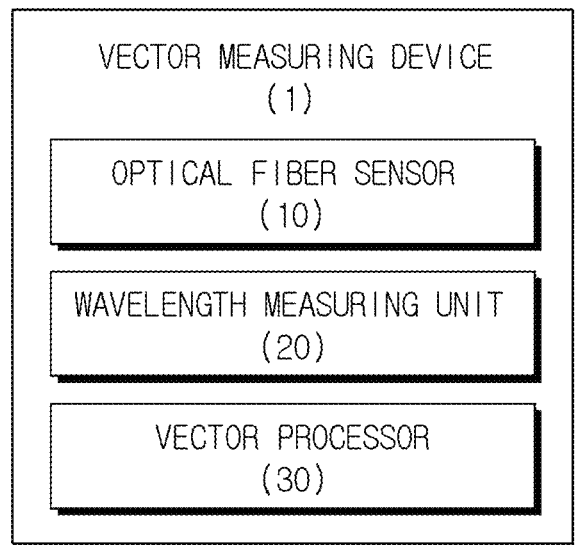
FIG. 12 is a block diagram illustrating a vector measuring device according to another exemplary embodiment of the present disclosure.

FIG. 12 is a block diagram illustrating a vector measuring device according to still another exemplary embodiment of the present disclosure.

The vector measuring device 1 includes an optical fiber sensor 10, a wavelength measuring unit 20 which transmits an optical signal to the optical fiber sensor and receives an optical signal with a changed wavelength, and a vector processor 30 which analyzes the optical signal with a changed wavelength to output a vector for a motion of the subject.

The optical sensor 10 includes a core in which Bragg gratings are formed and a cladding surrounding the core and the Bragg grating includes (i) three or more basic Bragg gratings and (ii) a sub Bragg grating located between two continuous basic Bragg gratings.

The wavelength measuring unit 20 includes a light source and a photo detector which detects a wavelength. The wavelength measuring unit 20 may transmit data in a wired or wireless manner.

The vector processor 30 extracts a peak of the wavelength, extracts, a magnitude and an interval of the wavelength, and also extracts a positive or negative sign with respect to the reference axis. The vector is output in accordance with an analysis result of the extracted data. A magnitude and a direction of the vector may be distinguished by comparing patterns of the data.

The vector processor 30 applies Fourier transformation to deliberately analyze a dynamic change of various wavelength shifts of a short period grating in a long period light wave.

Components included in the vector measuring device are combined to each other to be implemented by at least one module. The components are connected to a communication path which connects a software module or a hardware module in the apparatus to organically operate between the components. The components communicate with each other using one or more communication buses or signal lines.

The vector measuring device may be implemented in a logic circuit by hardware, firm ware, software, or a combination thereof or may be implemented using a general purpose or special purpose computer. The apparatus may be implemented using hardwired device, field programmable gate array (FPGA) or application specific integrated circuit (ASIC). Further, the apparatus may be implemented by a system on chip (SoC) including one or more processors and a controller.

The vector measuring device may be mounted in a computing device provided with a hardware element as a software, a hardware, or a combination thereof. The computing device may refer to various devices including all or some of a communication device for communicating with various devices and wired/wireless communication networks such as a communication modem, a memory which stores data for executing programs, a microprocessor which executes programs to perform operations and commands, and a display unit which outputs information.

Figure 13:
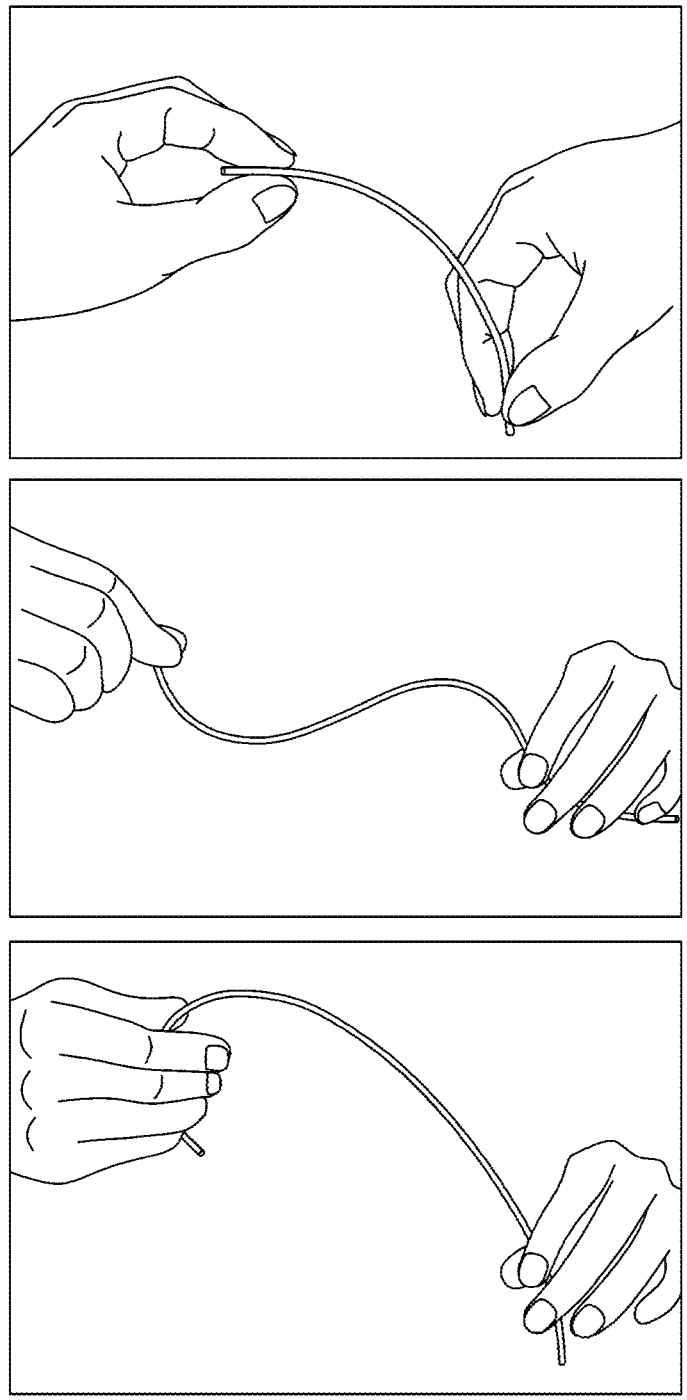
FIG. 13 is a view illustrating a motion of an optical fiber sensor according to another exemplary embodiment of the present disclosure.

FIG. 13 is a view illustrating a motion of an optical fiber sensor according to another exemplary embodiment of the present disclosure. The optical fiber sensor is bent and twisted to output a vector in accordance with the state.

Figure 14:
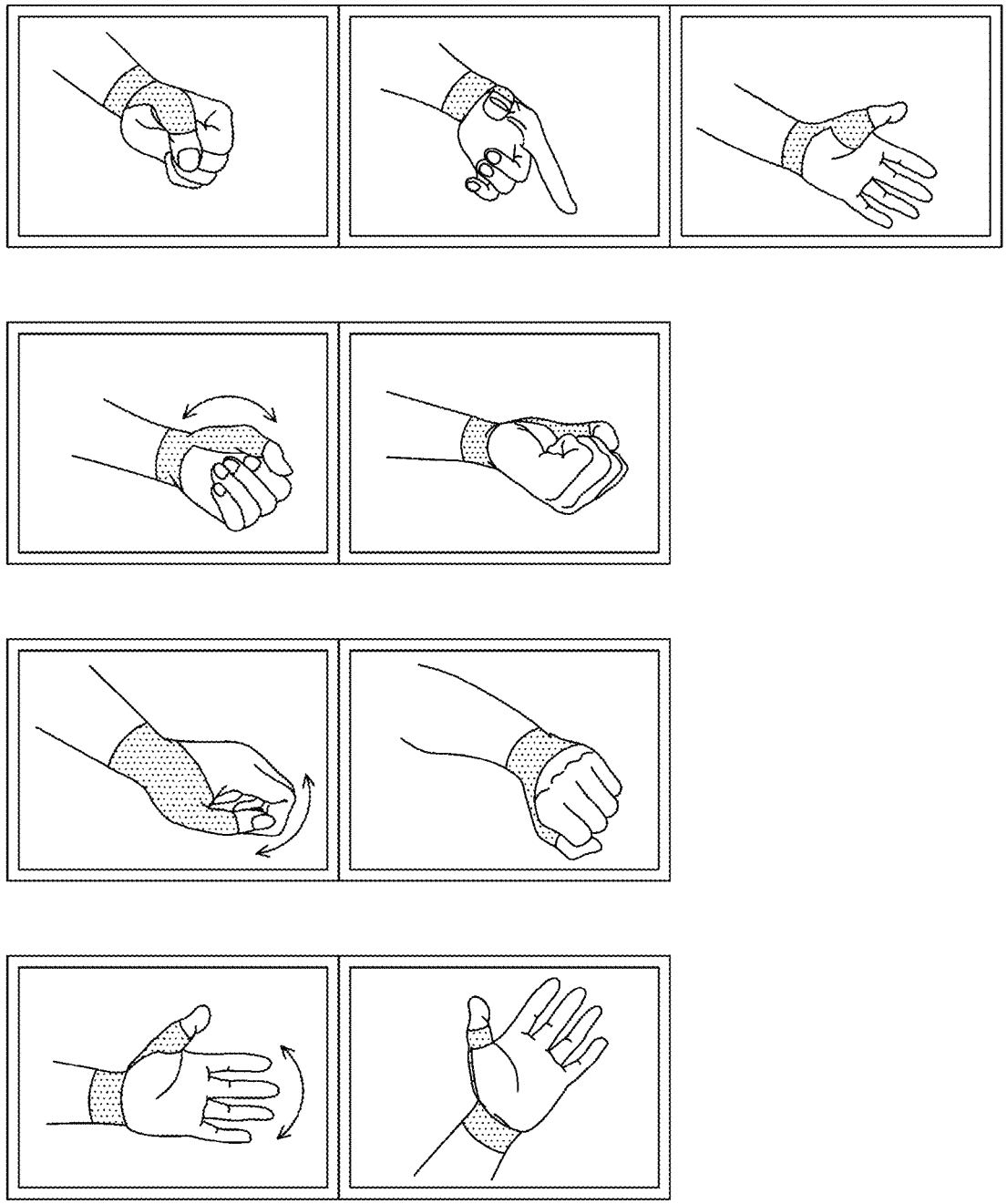
FIG. 14 is a view illustrating an optical fiber sensor according to another exemplary embodiment of the present disclosure which is attached to a body.

FIG. 14 is a view illustrating an optical fiber sensor according to another exemplary embodiment of the present disclosure which is attached to a body. The sub Bragg grating may be located on the wrist between the thumb and the wrist. The optical fiber sensor outputs a vector in accordance with a hand motion state.

Figure 15:
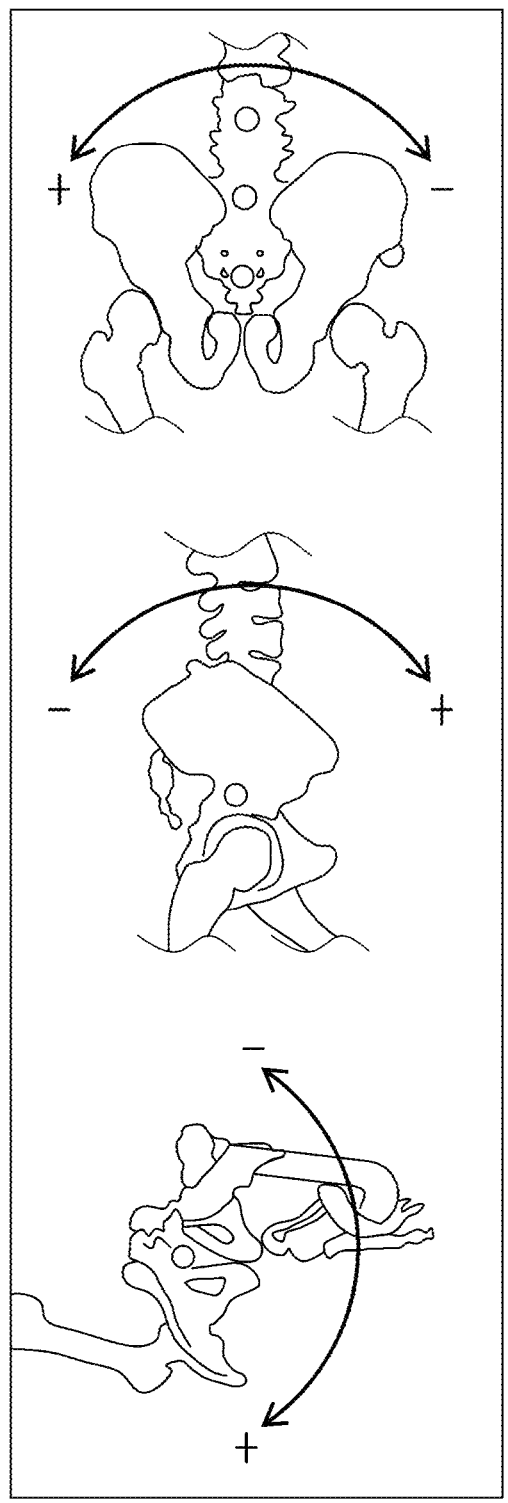
FIG. 15 is a view illustrating a motion of a pelvis.

FIG. 15 is a view illustrating a motion of a pelvis. The optical fiber sensor outputs a vector in accordance with oblique, tilted, and rotated states of the pelvis.

Figure 16:
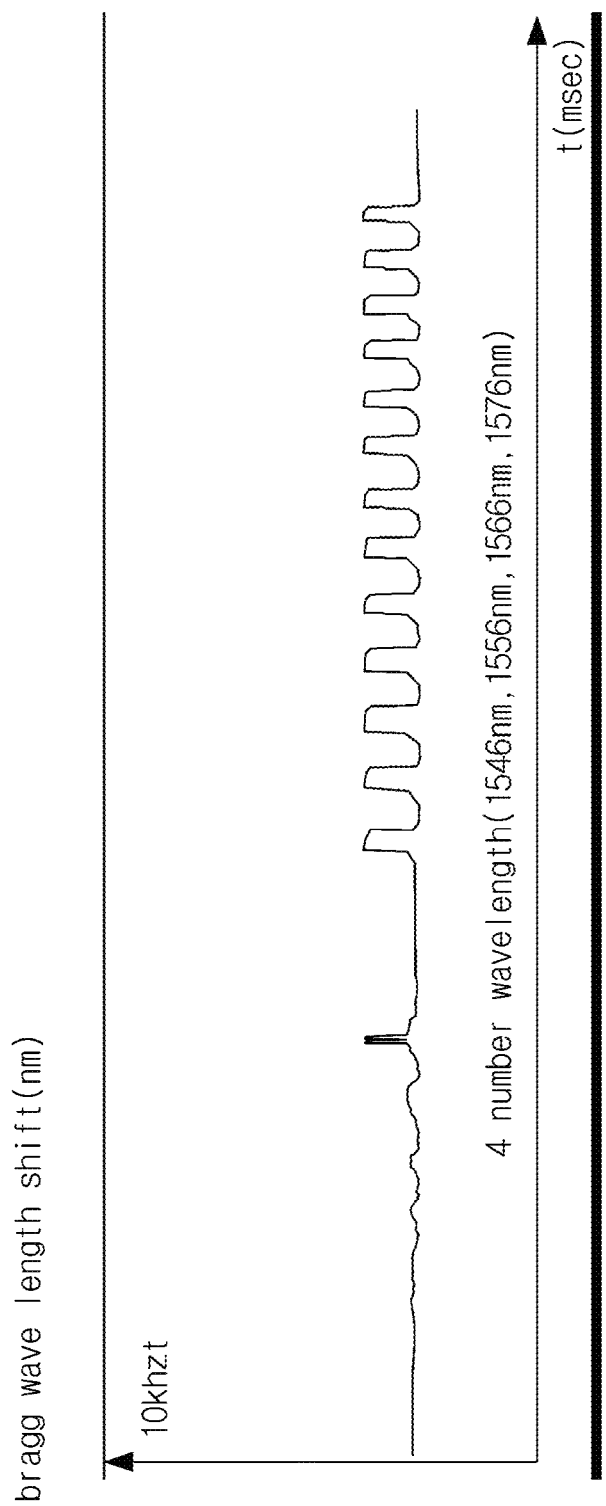
FIG. 16 is a view illustrating a plurality of wavelength bands applied to an optical fiber sensor according to another exemplary embodiment of the present disclosure.

FIG. 16 is a view illustrating a plurality of wavelength bands applied to an optical fiber sensor according to another exemplary embodiment of the present disclosure.

One wavelength, two wavelengths, and four wavelengths may be disposed in pairs to express a change of the signal with respect to an instantaneous time of a motion of the wavelength in various ways. Sensors belonging to the same pair may be located in different positions.

During the simulation process, as a wavelength, 1542 nm, 1552 nm, 1562 nm, 1572 nm are used, but these are merely an example so that other wavelength bands may also be used.

Figure 17:
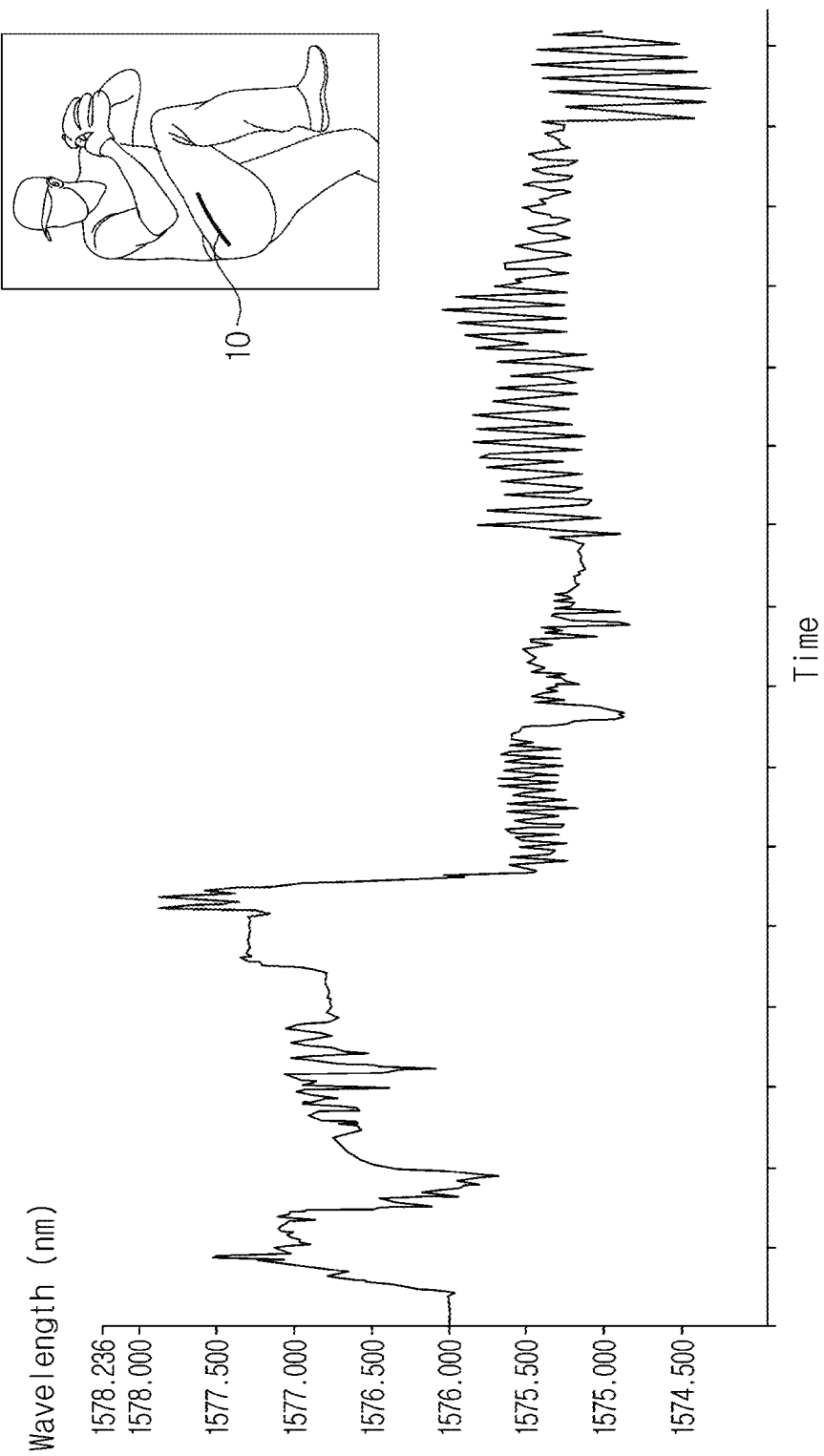

FIGS. 17 and 18 are views illustrating a change in a wavelength of an optical signal output from an optical fiber sensor in a state in which an optical fiber sensor according to another exemplary embodiment of the present disclosure is attached to a pelvis.

According to the optical fiber sensor of the present exemplary embodiment, the numerical change is amplified by a core with a helical structure and a relative vector analysis of a motion of the subject is possible by the double Bragg grating.

In FIG. 1, the respective processes are sequentially performed, but this is merely illustrative and those skilled in the art may apply various modifications and changes by partially changing the order illustrated in FIG. 1 or performing one or more processes in parallel or adding another process without departing from the essential gist of the exemplary embodiment of the present disclosure.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A method for manufacturing an optical fiber sensor, the method comprising:
    forming three or more basic Bragg gratings in a core; and
    forming a plurality of sub Bragg grating between two continuous basic Bragg gratings in the core,
    wherein in the forming of the three or more basic Bragg gratings, the basic Bragg gratings are formed in the core with a long period that includes a plurality of sections having varying lengths, and
    wherein in the forming of the plurality of sub Bragg gratings, the sub Bragg gratings are formed with a short period of a uniform length, and the short period is shorter than the lengths of the plurality of sections.

2. The method for manufacturing an optical fiber sensor according to claim 1, further comprising:
    before the forming of the three or more basic Bragg gratings,
    forming the core with a helical structure by rotating and injecting the core.

3. The method for manufacturing an optical fiber sensor according to claim 1, wherein in the forming of the three or more basic Bragg gratings, the basic Bragg gratings are formed by irradiating ultraviolet onto the core.

4. The method for manufacturing an optical fiber sensor according to claim 1, wherein in the forming of the plurality of sub Bragg gratings, the sub Bragg gratings are formed by irradiating pulse laser onto the core.

5. An optical fiber sensor, comprising:
    a core in which a Bragg grating is formed; and
    a cladding which surrounds the core,
    wherein the Bragg grating includes (i) three or more basic Bragg gratings and (ii) a plurality of sub Bragg gratings located between two continuous basic Bragg gratings,
    wherein the three or more basic Bragg gratings are formed in the core with a long period that includes a plurality of sections having varying lengths, and
    wherein the plurality of sub Bragg gratings are formed between the two continuous basic Bragg gratings with a short period of a uniform length, and the short period is shorter than the lengths of the plurality of sections.

6. The optical fiber sensor according to claim 5, further comprising:
    a protective layer which surrounds the cladding,
    wherein the core is formed with a helical structure.

7. The optical fiber sensor according to claim 6, wherein the protective layer is implemented by a woven material, and a helical angle of the helical structure and a braiding angle of the woven material are set to satisfy a predetermined condition range.

8. The optical fiber sensor according to claim 6, wherein the core with the helical structure moves a wavelength of the Bragg grating using an elastic wave in accordance with the helical structure and accelerates a direction switching speed of the optical fiber sensor.

9. The optical fiber sensor according to claim 6, wherein the core with the helical structure changes a critical angle of light by modifying an incident angle of light in accordance with the helical structure.

10. The optical fiber sensor according to claim 8, wherein the basic Bragg grating does not affect the movement of the wavelength of the Bragg grating and forms a periodical pattern in a magnitude of the wavelength of the Bragg grating to provide a relative reference for space measurement.

11. The optical fiber sensor according to claim 5, wherein the basic Bragg grating operates as a filter which passes regions other than a peak of a spectrum by a coupling phenomenon by interaction of a core mode and a cladding mode.

12. The optical fiber sensor according to claim 5, wherein the long period includes a plurality of chirp sections having non-uniform lengths which linearly or non-linearly change in a light traveling direction.

13. The optical fiber sensor according to claim 5, wherein a resonance of an optical signal is formed by a wavelength shift of the basic Bragg grating and a wavelength shift of the sub Bragg grating.

14. The optical fiber sensor according to claim 5, further comprising:
a plurality of elastic strings which surrounds the cladding.

15. The optical fiber sensor according to claim 5, wherein the core and the cladding are formed on an elastic body, the elastic body includes a curve section and a linear section, and the sub Bragg grating is located in the linear section.

16. A vector measuring device comprising:
an optical fiber sensor;
a wavelength measuring unit which transmits an optical signal to the optical fiber sensor and receives an optical signal with a changed wavelength; and
a vector processor which analyzes the optical signal with the changed wavelength to output a vector for a motion of a subject,
wherein the optical fiber sensor includes:
a core in which a Bragg grating is formed; and
a cladding which surrounds the core,
wherein the Bragg grating includes (i) three or more basic Bragg gratings and (ii) a plurality of sub Bragg gratings located between two continuous basic Bragg gratings,
wherein the three or more basic Bragg gratings are formed in the core with a long period that includes a plurality of sections having varying lengths, and
wherein the plurality of sub Bragg gratings are formed between the two continuous basic Bragg gratings with a short period of a uniform length, and the short period is shorter than the lengths of the plurality of sections.

* * * * *